United States Patent [19]
Kobayashi

[11] Patent Number: 4,860,608
[45] Date of Patent: Aug. 29, 1989

[54] CONTROL DEVICE FOR A VERTICAL SHAFT TYPE ENGINE

[75] Inventor: Kazuyuki Kobayashi, Nagoya, Japan

[73] Assignee: Mitsubishi Jukogyo Kabushiki Kaisha, Tokyo, Japan

[21] Appl. No.: 143,057

[22] Filed: Jan. 12, 1988

[30] Foreign Application Priority Data

Jan. 14, 1987 [JP] Japan ............................... 62-2878[U]

[51] Int. Cl.[4] ......................... F16C 1/10; F02D 11/02

[52] U.S. Cl. .................................. 74/501.6; 74/500.5; 123/400; 123/403

[58] Field of Search ............................ 74/500.5, 501.6; 56/10.8, 11.1, 255; 123/400, 403, 376

[56] References Cited

U.S. PATENT DOCUMENTS 1,932,802 10/1933 Pierce ............................ 123/400 X
3,749,069 7/1973 Reese ................................ 123/376
4,221,202 6/1978 Wick .............................. 123/403 X
4,756,287 7/1988 Sakakibara ...................... 123/376 X

FOREIGN PATENT DOCUMENTS 207654 8/1957 Australia ............................. 56/10.8

*Primary Examiner*—Gary L. Smith
*Assistant Examiner*—Flemming Saether
*Attorney, Agent, or Firm*—Wenderoth, Lind & Ponack

[57] ABSTRACT

A control device for a vertical shaft type engine controls the engine by a single manipulation or acceleration control lever from stoppage to choking. The control device includes a first control lever and a second control lever which are relatively rotatable and can rotate jointly within a predetermined range. The first control lever is connected to a governor spring and is rotatable between an engine stop switch terminal and a highest speed rotation regulating screw. The second control lever is provided with a connecting section for connection to a Bowden wire which is in turn connected to the manipulation or acceleration control lever on a working machine, a pair of engaging sections for engaging with the first control lever and phase-shifted by 180° from each other, and a pair of contact sections for contacting a choke lever and phase-shifted by 180° from each other. Thus, the direction of movement of the connection between the second control lever and the Bowden wire can be reversed by remounting the second control lever phase-shifted by 180°. Clamp sections for the Bowden wire are provided on a control panel cover at two locations on each of the left and right sides thereof, that is, at four locations in total.

8 Claims, 7 Drawing Sheets

FIG. 7(a)
(PRIOR ART)
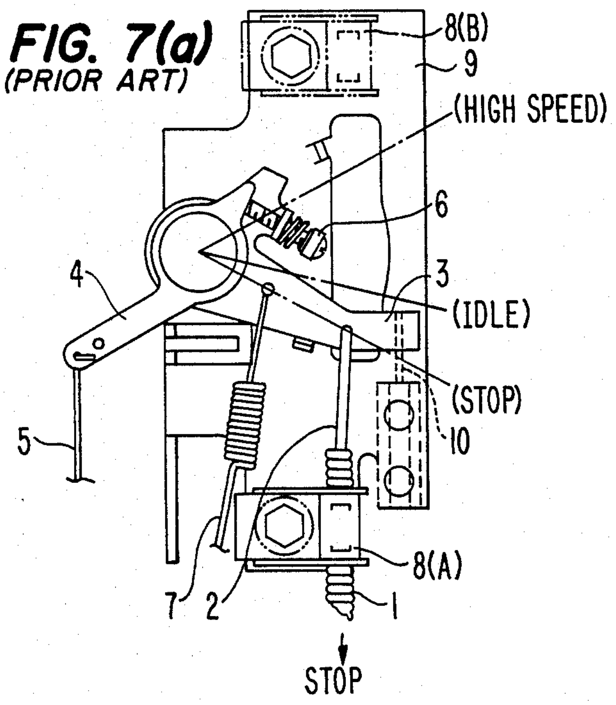
FIG. 7(b)
(PRIOR ART)
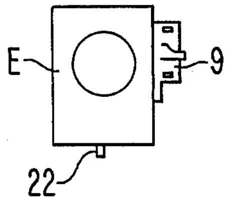
FIG. 8(a)
(PRIOR ART)
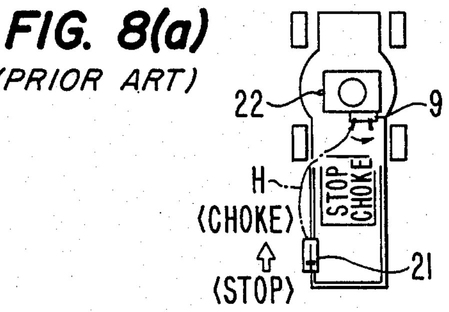
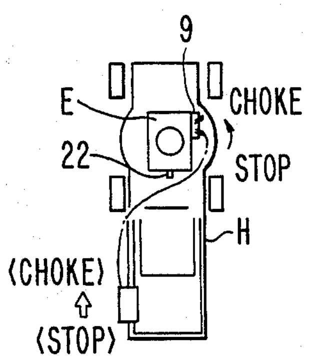
FIG. 8(b)
(PRIOR ART)
FIG. 9
(PRIOR ART)
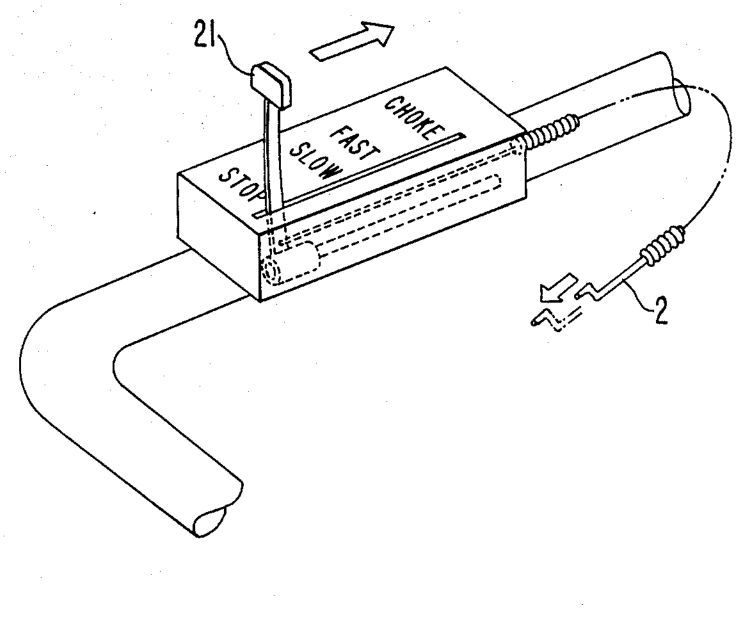

CONTROL DEVICE FOR A VERTICAL SHAFT TYPE ENGINE

BACKGROUND OF THE INVENTION

1. Field of the Invention

The present invention relates to a control device for a vertical shaft type engine.

2. Description of the Prior Art

In a typical lawn mower on which a vertical shaft type engine is mounted, control of the engine is effected by means of single manipulation lever or acceleration control. Thus, it is necessary to provide an engine control device capable of achieving all the functions of stoppage, rotational speed regulation and choking.

Such prior art control device, as shown in FIGS. 7(*a*) and 7(*b*), includes a control lever 3 rotatably mounted on a control panel 9 provided with a stop switch terminal 10, and one end of the control lever 3 can be brought into contact with a choke control plate 4.

A Bowden wire 1 has its outer cable fixedly secured to the control panel 9 by means of a wire clamp 8(A). An inner cable 2 of the Bowden wire 1 is moved in the forward and backward directions by manipulating a manipulation or acceleration control lever 21 on a working machine H, e.g. a lawn mower, as shown in FIGS. 8(*a*), 8(*b*) and 9, and one end of the inner cable 2 is connected to the control lever 3 (FIG. 7(*a*)). When the control lever 3 is moved to a position closest to the wire clamp 8(A), it comes into contact with the stop switch terminal 10 to stop an engine E as shown in FIG. 7(*a*), while when lever 3 is moved to a position farthest from the wire clamp 8(A), a rotational speed regulating screw 6 provided on the control lever 3 comes into contact with the choke control plate 4 and rotates the choke control plate 4, and the construction is such that a choke valve in a carburetor, not shown, is closed by a choke rod 5 connected to the choke control plate 4.

The rotational speed of the engine E is controlled by expanding and contracting a governor spring 7 engaged with the control lever 3 in accordance with rotation of the control lever 3, thus moving a governor lever (not shown) engaged with the other end of the governor spring 7 and regulating an opening angle of a carburetor throttle valve (not shown) connected to the governor lever. When the control lever 3 is close to the stop switch terminal 10 of the engine E, the engine E rotates at a low speed, but just before the control lever 3 comes into contact with the choke control lever 4, the engine rotates at a high speed.

The lever 21 on the working machine H for controlling the engine E may be of the type such that engine E is accelerated to a high speed when the inner cable 2 of the Bowden wire 1 is moved in a projecting direction as shown in FIG. 9. Alternatively, lever 21 may be of the type such that the engine E is accelerated to a high speed when the inner cable 2 of the Bowden wire 1 is moved in a retracting direction. Consequently, in the case of a control device having such structure that when lever 21 on a working machine H is manipulated in the direction of projecting inner cable 2 of Bowden wire 1, the engine E is accelerated to a high speed as shown in FIG. 9, a wire clamp position with respect to the control panel 9 is selected to be 8(A) in FIG. 7(*a*), while in the case of a control device having such structure that when lever 21 on the working machine H is manipulated in the direction of retracting the inner cable 2 of the Bowden wire 1, the engine E is accelerated to a high speed, the wire clamp position with respect to the control panel 9 is selected to be 8(B) in FIG. 7(*a*).

In FIGS. 8(*a*) and 8(*b*) are shown two examples of mounting orientation or attitude of an engine according to the prior art, in the case where the engine E is choked when lever 21 of the working machine H is manipulated in the direction of projecting the inner cable 2 of the Bowden wire 1. Since the stop switch terminal 10 is located in the direction of mounting of an ignition plug 22 on the engine E, in order to minimize the length of the inner cable 2 of the Bowden wire 1 on the working machine H, the only possible attitudes of mounting of an engine are the two varieties shown in FIGS. 8(*a*) and 8(*b*).

In the engine control device in the prior art in which an engine is manipulated from "stoppage" to "choking" by means of a single Bowden wire, there is a disadvantage that in order to simplify routing of the Bowden wire 1 the mounting attitude of the engine is restricted, depending upon the direction of manipulation of lever 21 on a working machine H, that is, depending upon whether the engine is accelerated to a high speed when the inner cable 2 of the Bowden wire 1 is projected or retracted, as described above.

In the case where the working machine H has such structure that it is accelerated to a high speed when the inner cable 2 is projected, only the mounting positions of the engine as shown in FIGS. 8(*a*) and 8(*b*) are practical, and it is difficult to select a position where the ignition plug 22 is directed in the travelling direction of the working machine for the purpose of facilitating maintenance operations.

SUMMARY OF THE INVENTION

It is therefore one object of the present invention to provide an improved control device for a vertical shaft type engine that is free from the above-described disadvantages of the prior art.

A more specific object of the present invention is to provide a control device for a vertical shaft type engine, whereby it is possible to arbitrarily select a mounting attitude or orientation of the engine on a working machine regardless of the structure of a manipulation or acceleration control lever on the working machine, and which is advantageous for design and for maintenance service operations.

According to one feature of the present invention, there is provided a control device for controlling a vertical shaft type engine mounted on a working machine from stoppage to choking, wherein a control lever is constructed of a first control lever and a second control lever which are relatively rotatable and can rotate jointly within a predetermined range. The first control lever is connected to a governor spring and is rotatable between an engine stop switch terminal and a highest speed rotation regulating screw. The second control lever is provided with a connection portion or section to a Bowden wire which is in turn connected to a manipulation or acceleration control lever on a working machine, a pair of engaging portions or sections for engaging the first control lever and phase-shifted by 180° from each other, and a pair of contact portions or sections for engaging a choke lever and phase-shifted by 180° from each other. Thus, the direction of movement of the connecting point between the second control lever and the Bowden wire can be reversed by remounting the second control lever at positions phase-shifted by 180°. Also, clamp portions or sections for mounting the Bowden wire are provided on a control panel cover or member at two locations on each of left and right sides thereof, that is, at four locations in total.

According to the present invention, owing to the above-featured construction of the control device for a vertical shaft type engine, the mounting attitude of the engine can be arbitrarily selected regardless of the structure of the manipulation or acceleration control lever on the working machine, and hence maintenance and service of the engine when it is mounted on the working machine is improved.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings, FIGS. 1 to 6(*d*) show one preferred embodiment of the present invention, while FIGS. 7(*a*) to 9 show one example of a control device in the prior art, wherein:

FIG. 7(*a*) is a front view of a control device in the prior art;

FIG. 7(*b*) is a schematic view showing a state of mounting the control device in FIG. 7(*a*) on an engine;

FIGS. 8(*a*) and 8(*b*) are plan views showing different states of mounting the control device in FIG. 7(*a*) on a machine; and FIG. 9 is an enlarged perspective view showing a structure of an acceleration control lever on a machine.

DESCRIPTION OF THE PREFERRED EMBODIMENT

Now description will be made of one preferred embodiment of the present invention with reference to FIGS. 1 through 6(*d*).

Figure 1:
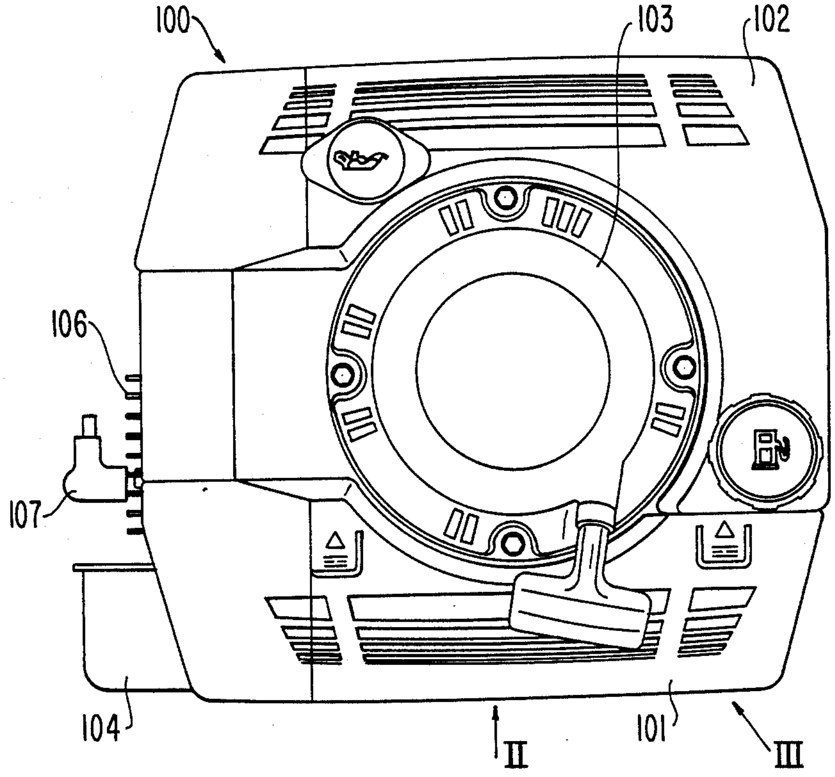
FIG. 1 is a plan view of a vertical shaft type engine embodying the present invention.
Figure 2:
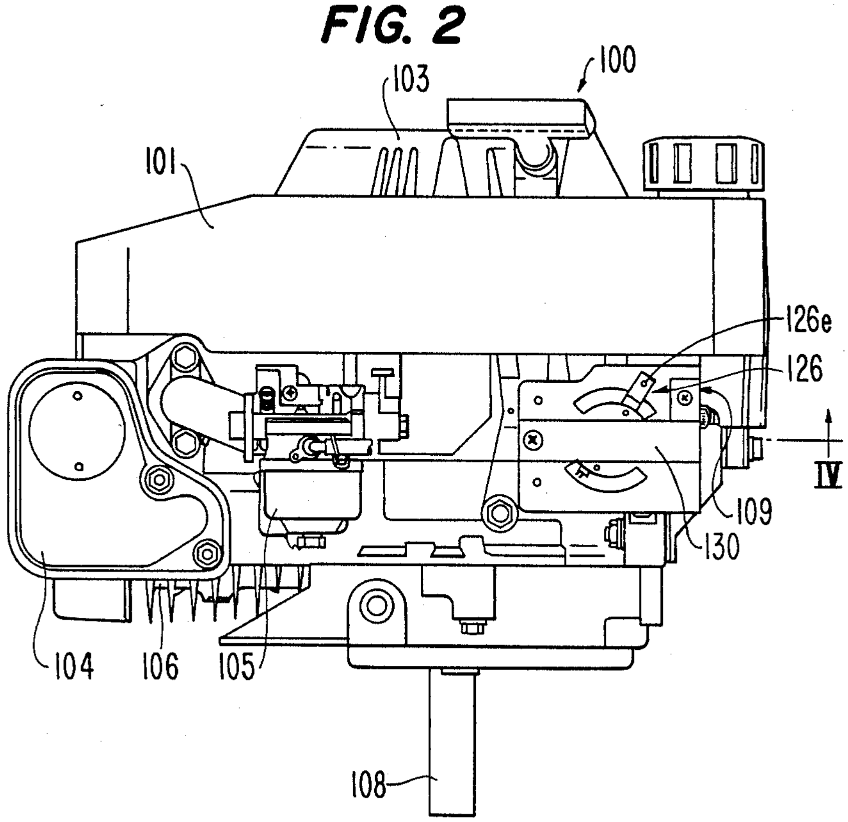
FIG. 2 is a side view of the engine as viewed in the direction of arrow II in FIG. 1.

As shown in FIGS. 1 and 2, an engine 100 is a vertical shaft type air-cooled general purpose engine, which is composed of an air cleaner 101, a fuel tank 102, a recoil starter 103, a muffler 104, a carburetor 105, a cylinder 106, an ignition plug 107, an output shaft 108, a control device 109, and other typical elements.

Figure 4:
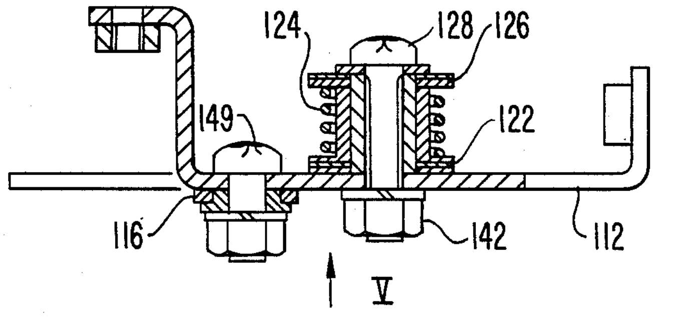
FIG. 4 is a partial cross-sectional view of the control device as viewed in the direction of arrow IV in FIG. 2 (omitting a control panel cover)
Figure 5:
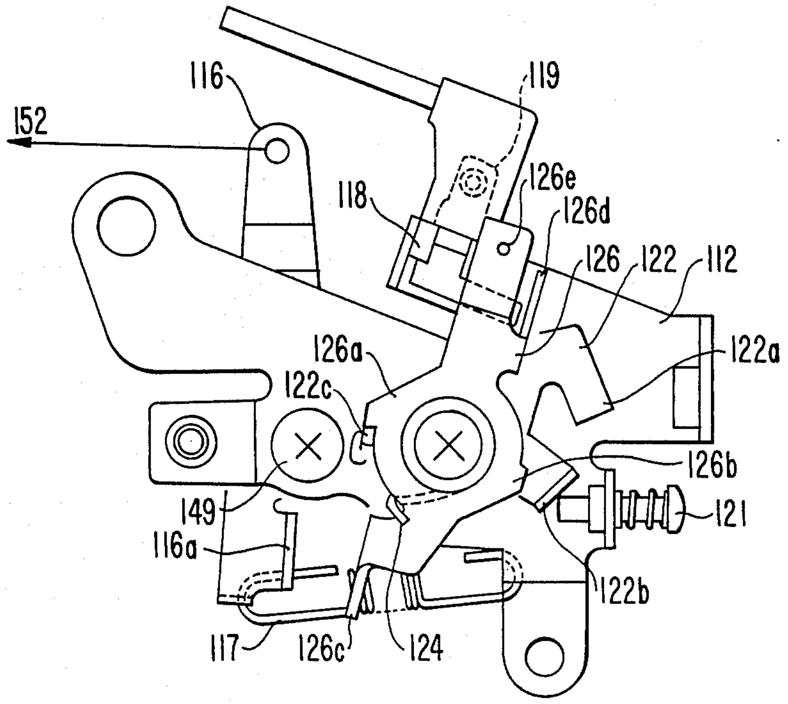
FIG. 5 is a partial side view of the control device as viewed in the direction of arrow V in FIG. 4.

With regard to the control device 109 which forms an essential part of the present invention, it will be described in detail with reference to FIGS. 3 to 5.

A control panel 112 serving as a medium for mounting the control device 109 to an engine E, is fixedly secured to the engine E by means of bolts 111 and 114. Onto this control panel 112 is mounted a stop switch terminal 119 via an insulator 118. A choke lever 116 is rotatably mounted onto the panel 112 by means of a screw 149, a spacer 110, a washer 150 and a nut 151. Furthermore a choke rod 152 adapted to be connected with the carburetor 105 is mounted on the choke lever 116, and a return spring 117 is stretched between the control panel 112 and the choke lever 116 to cause the choke lever 116 to maintain open the choke valve (not shown) of the carburetor except when it is necessary to close the choke valve.

In addition, a first control lever 122 for controlling the rotational speed of the engine E is sandwiched between spacers 115 and 123 both made of resin for reducing friction upon rotation, and is associated with a second control lever 126. A return spring 124 is interposed between levers 122, 126 with an initial loading. Levers 122, 126 and spring 124 are fixedly assembled to panel 112 so as to be freely rotatable relative thereto by means of washers 127, 141 and 140, a screw 128 and a nut 142.

Figure 3:
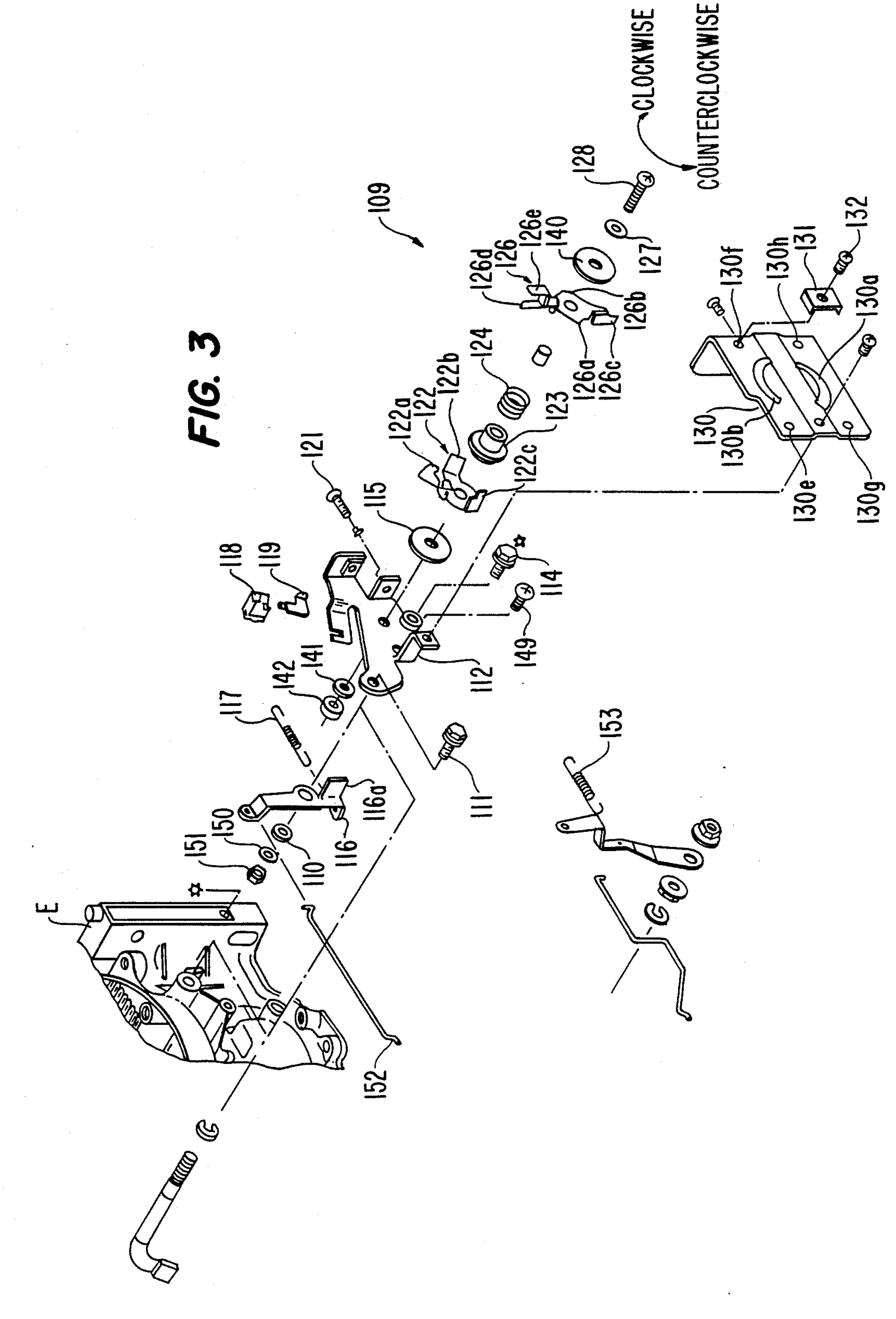
FIG. 3 is an exploded perspective view of a control device in the engine as viewed in the direction of arrow III in FIG. 1.

On the first control lever 122 is mounted a governor spring 153 for regulating an opening angle of a throttle valve in the carburetor in order to maintain the rotational speed of the engine constant independent of the load on the engine, and a contact end portion 122*a* of the first control lever 122 is adapted to come into contact with the stop switch terminal 119 when the first control lever 122 is rotated in the counterclockwise direction as viewed in FIG. 3. On the other hand, when the first control lever 122 is rotated in the clockwise direction as viewed in FIG. 3, another contact end portion 122*b* of the first control elver 122 is adapted to come into contact with a regulating screw 121 which restricts the highest rotational speed of the engine, and thereby the rotational speed of the engine is controlled.

The second lever 126, to which one end of the inner cable 2 of the Bowden wire 1 in the control device according to the present invention is connected at a hole 126*e*, is formed in such manner that it can be mounted in two alternative set conditions which are phase-shifted by 180° from each other. Under a first set condition, a hook section 122*c* of the first control elver 122 is engaged with an engaging section 126*a* or 126*b* (in the illustrated case, assumed to be "126*a*") of the second control lever 126. Thus, when the second control lever 126 rotates in the clockwise direction as viewed in FIG. 3, the first control lever 122 is jointly rotated due to the initial loading of the return spring 124. After the first control lever 122 has been brought into contact with the highest speed regulating screw 121 to thereby restrict further rotation of lever 122, the engaging section 126*a* of the second control lever 126 is separated from the engaging hook section 122*c* of the first control lever 122, and thereafter only the second control lever 126 is rotated. Then a contact section 126*c* of the second control lever 126 comes into contact with a folded or bent section 116*a* of the choke lever 116, and thereby the choke lever 116 is rotated in the clockwise direction as viewed in FIG. 3. it is to be noted that the rotation of the second control lever 126 is restricted by a notch or slot 130*a* or 130*b* in a control panel cover 130.

Alternatively to the above arrangement, under a second set condition where the second control lever 126 is mounted phase-shifted by 180° with respect to the first control lever 122, the second control lever 126 engages with the first control lever 122 at the engaging section 126*b* and engages with the folded or bent section 116*a* of the choke lever 116 at an engaging section 126*d*. Therefore, it is possible to change the position where the Bowden wire 1 in the control device according to the present invention is mounted to a mounting hole 126e in the second control lever 126 projecting from the control panel cover 130, by appropriately selecting the orientation of the second control lever 126 with respect to the first control lever 122.

Figure 6A:
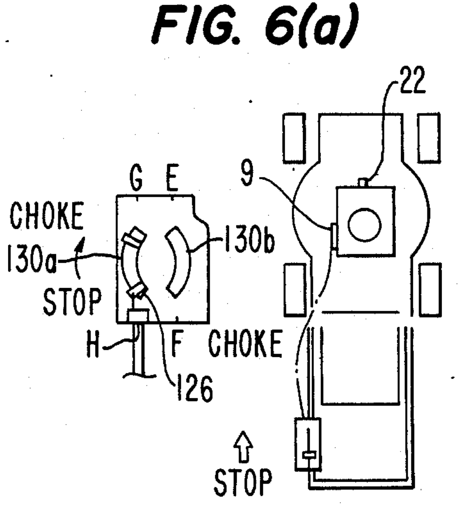
FIGS. 6(*a*)–6(*d*) are schematic views showing different states of mounting of the control device shown in FIG. 1 to 5.
Figure 6B:
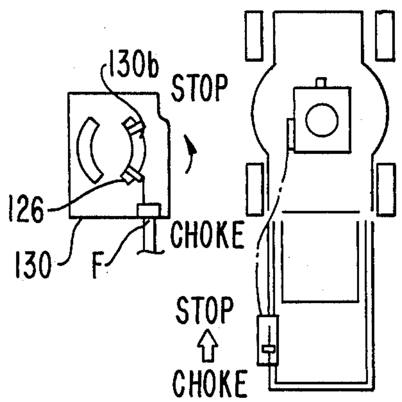
Figure 6C:
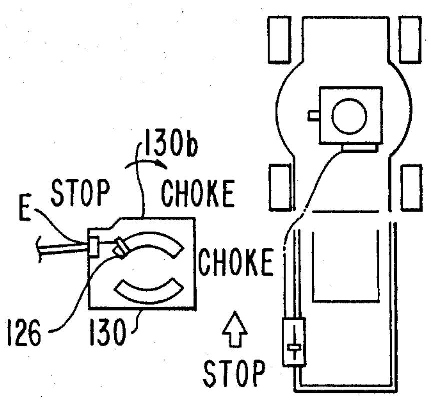
Figure 6D:
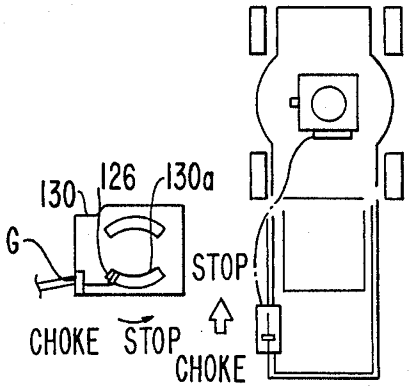

Therefore, as shown in FIG. 3, in the control panel cover 130 are formed threaded holes 130e, 130f, 130g and 130h for clamping the outer cable of the Bowden wire at two locations on the left and right sides, respectively, that is, at four locations in total corresponding to the notches 130a and 130b so that the outer cable of the Bowden wire can be clamped at any one location among these four locations by means of a wire clamp 131 and a screw 132. In FIG. 6(a), reference characters E, F, G and H designate the clamp positions at the above-mentioned four locations. FIGS. 6(a) and 6(b) illustrate situations where the engine is mounted with the position of the ignition plug 22 directed in the travelling direction of the working machine, FIG. 6(a) showing a control device having such structure that the engine is accelerated to a high speed when the manipulation or acceleration control lever on the working machine is moved in the direction of projecting the inner cable 2 of the Bowden wire 1, and FIG. 6(b) showing a control device having such structure that the engine is accelerated to a high speed when the manipulation or acceleration control lever on the working machine is moved in the direction of retracting the inner cable 2 of the Bowden wire 1. FIGS. 6(c and 6(d) illustrate situations where the engine is mounted with the position of the ignition plug 22 directed in the leftward direction with respect to the travelling direction of the working machine, FIG. 6(c showing a control device having such structure that the engine is accelerated to a high speed when the manipulation or acceleration control lever on the working machine is moved in the direction of projecting the inner cable 2 of the Bowden wire 1, and FIG. 6(d) showing a control device having such structure that the engine is accelerated to a high speed when the manipulation or acceleration lever on the working machine is moved in the direction of retracting the inner cable 2 of the Bowden wire 1. The set condition of the second control lever 126 and the clamped position of the Bowden wire 1 in each case are as shown in the corresponding figures, and the inner cable 2 of the Bowden wire 1 is connected to the hole 126e in the second control lever 126.

Under the condition where the second control lever 126 projects from the notch 130b in the control panel cover 130 with the ignition plug 22 directed in the travelling direction, when the second control lever 126 rotates in the clockwise direction, the engine is controlled sequentially in the modes of "stoppage">>"-low speed">>"high speed">>"choking" (FIG. 6(b)).

Also, under the condition where the second control lever 126 projects form the notch 130a in the control panel cover 130 with the ignition plug directed in the travelling direction, when the second control lever 126 rotates in the clockwise direction, the engine is controlled sequentially in the modes of "stoppage">>"-low speed">>"high speed">>"choking" (FIG. 6(a)).

Under both the above-mentioned two exemplified conditions, as a result of rotation of the second control lever 126 in the clockwise direction the engine takes similar operating conditions sequentially in the modes of "stoppage">>"low speed">>"high speed">>" choking", but the directions of movement of the connecting point 126e between the second control lever 126 and the inner cable 2 are opposite to each other for the respective conditions.

The same is also true in the conditions illustrated in FIGS. 6(c and 6(d) where the engine is mounted with the ignition plug 22 directed in the leftward direction.

Therefore, according to the present invention, since the attitude of mounting of the engine is not restricted or dependent on the structure of the manipulation or acceleration control lever in a working machine such as a lawn mower, maintenance of, e.g. the ignition plug or the control device, is facilitated and also routing of a Bowden wire can be simplified.

As described in detail above, in the control device according to the present invention it is possible to reverse the direction of movement of a control wire for an engine by merely modifying the method of assembly of the component parts of the control device, the attitude of mounting of the engine can be arbitrarily chosen regardless of the structure of a manipulation or acceleration control lever on a working machine, and therefore, ease of maintenance of the control device, the ignition plug and the like can be improved.

Since many changes and modifications can be made to the above-described constructions without departing from the spirit of the present invention, all matter contained in the above description and illustrated in the accompanying drawings shall be interpreted to be illustrative and not as a limitation to the scope of the invention.

I claim:

1. In a control assembly for controlling the operation, between stopping and choking, of a vertical shaft type engine to be mounted on a working machine and having an engine stop terminal and a carburetor including a choke valve and a throttle valve, said control assembly comprising a choke lever to be mounted on the engine in operable connection with the choke valve for rotation between a non-choking position and a choking position, a control device to be rotatably mounted on the engine for cooperation with said choke lever, the throttle valve and the engine stop terminal, a Bowden wire including an outer cable to be fixedly mounted on the engine and an inner cable movable relative to said outer cable, said inner cable having a first end connected to said control device and a second end, and a single acceleration control lever connected to said second end of said inner cable and to be mounted on the working machine, the improvement wherein said control device comprises:

a first control lever to be mounted on the engine for rotation in a direction of increasing engine speed between an engine stop position, whereat a portion of said first control lever operates the engine stop terminal to stop the engine, and a highest engine speed rotation position, whereat further rotation of said first control lever is prevented, said first control lever to be operatively connected to the throttle valve to change the engine speed in response to rotation of said first control lever in said direction of increasing engine speed, and said first control lever having an abutment member;

a second control lever having a connecting portion connected to said first end of said inner cable of said Bowden wire, said second control lever to be mounted on the engine for rotation about an axis of rotation in response to manipulation of said single acceleration control lever and having a pair of engaging portions phase-shifted relative to each other by 180° about said axis of rotation and a pair of contact portions phase-shifted relative to each other by 180° about said axis of rotation, said second control lever being rotatable about said axis of rotation in said direction of increasing engine speed between a first position, whereat said abutment member of said first control lever engages a first said engaging portion of said second control lever, and a second position, whereat a first said contact portion of said second control lever moves said choke lever to said choking position, said second position being beyond said highest engine speed rotation position of said first control lever in said direction of increasing engine speed;

means for, upon said second control lever being rotated in said direction of increasing engine speed from said first position toward said second position, causing said first control lever to rotate with said second control lever between said engine stop position and said highest engine speed rotation position; and said second control lever being remountable in an alternative orientation with said connecting portion phase-shifted relative to said first control lever by 180° about said axis of rotation, such that said abutment member of said first control lever engages a second said engaging portion of said second control lever at said first position of said second control lever and a second said contact portion of said second control lever moves said choke lever to said choking position at said second position of said second control lever; and further comprising means for mounting said outer cable of said Bowden wire at four alternative locations, depending on the orientation of said second control lever relative to said first control lever and on the orientation of the engine relative to the working machine.

2. The improvement claimed in claim 1, further comprising a control panel to be mounted on the engine, said first and second control levers being coaxially mounted about a common axis on said control panel for rotation relative thereto.

3. The improvement claimed in claim 2, wherein said means for causing said first control lever to rotate with said second control lever in said direction of increasing engine speed comprises a return spring mounted about said common axis and urging said first control lever in said direction of increasing engine speed.

4. The improvement claimed in claim 3, wherein, upon rotation of said second control lever by said inner cable of said Bowden wire about said common axis in a direction opposite to said direction of increasing engine speed, said first or second engaging portion of said second control lever contacts said abutment member of said first control lever and rotates said first control lever in said opposite direction against the force of said return spring.

5. The improvement claimed in claim 2, wherein said outer cable mounting means comprises a control panel cover member mountable on said control panel in a plurality of orientations, said cover member having first and second opposite sides, each said side having therein two outer cable clamping means.

6. The improvement claimed in claim 5, wherein said cover member has therein a pair of slots, said second control lever extending through a selected one of said slots, said selected slot limiting the range of rotation of said second control lever in opposite directions about said common axis.

7. The improvement claimed in claim 6, wherein said pair of slots are phase-shifted relative to each other about said common axis.

8. The improvement claimed in claim 1, further comprising a governor spring connected to said first control lever and to be connected to the throttle valve.

* * * * *